United States Patent Office 3,177,780
Patented Apr. 13, 1965

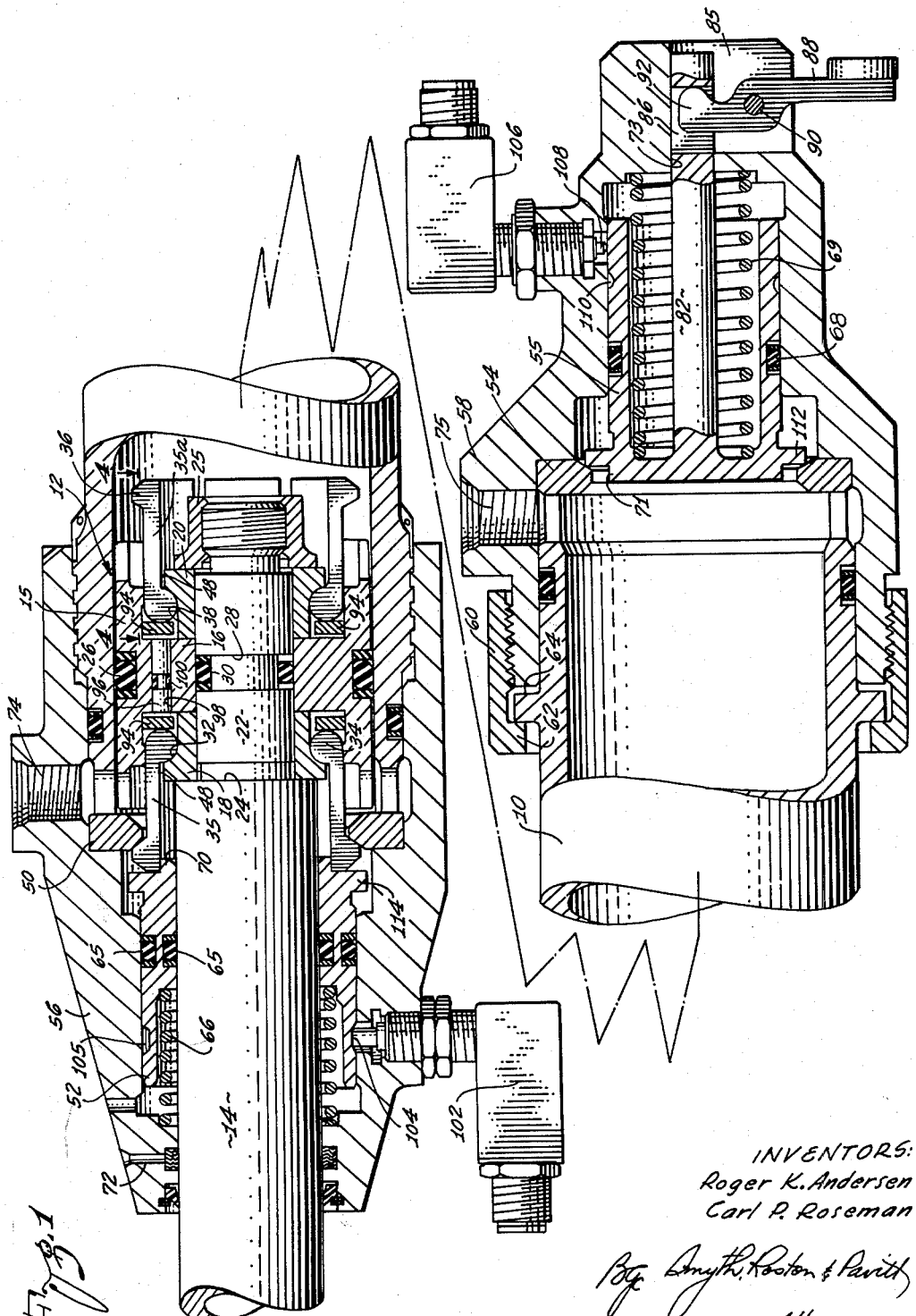

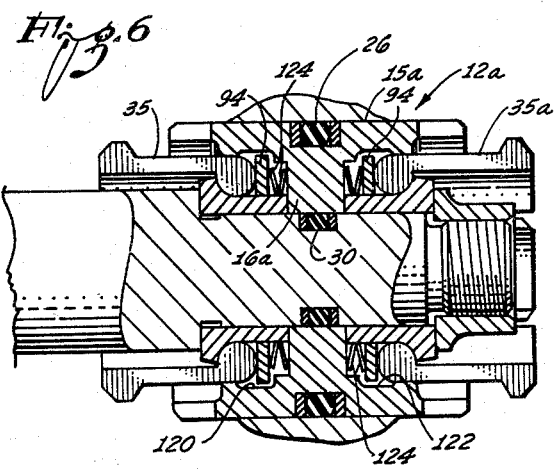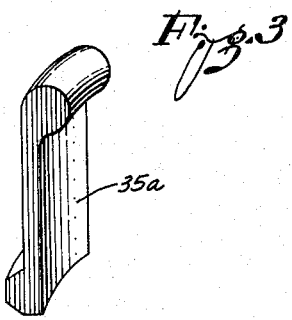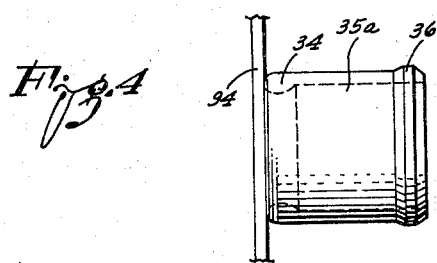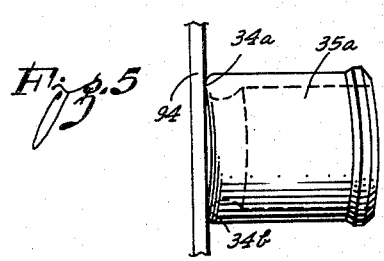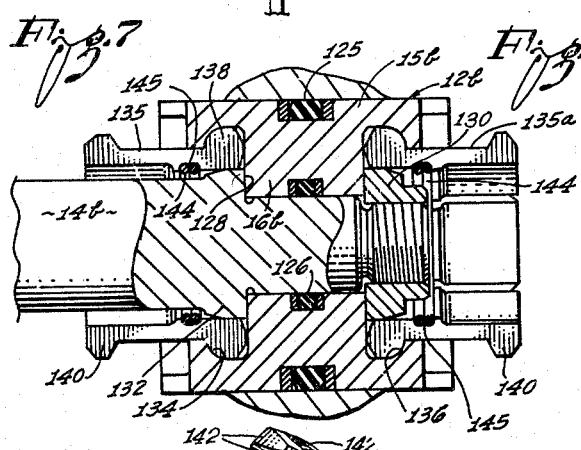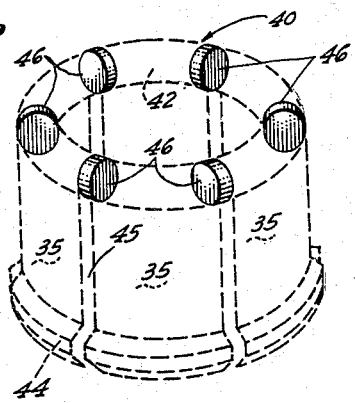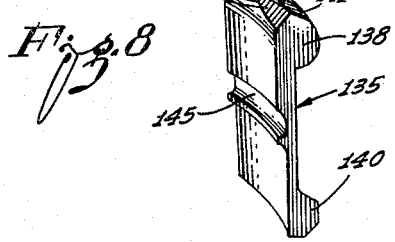

3,177,780
LOCKING CYLINDER
Roger K. Andersen, 2655 226th St., Torrance, Calif., and Carl P. Roseman, 4000 Vista Court, La Crescenta, Calif.
Filed May 27, 1963, Ser. No. 283,402
15 Claims. (Cl. 92—24)

This invention relates to an extensible and retractable hydraulic actuator comprising a cylinder and piston therein and is particularly directed to means for automatically locking the piston at at least one of its limit positions. Such a locking means typically automatically latches and locks the piston in response to arrival of the piston at the limit position and subsequently automatically releases the piston in response to the application of fluid pressure in a direction to shift the piston away from the limit position.

One important problem met by the invention is to provide a circumferential series of latching fingers that are of simple construction, easy to fabricate, but at the same time are of rugged high strength construction to withstand axial forces of high magnitude. In many devices of this type, the latching fingers are constructed by slitting one end of a sleeve, the base ends of all of the fingers being integral with each other. One disadvantage of such a construction is the time, care, and expense involved in cutting the longitudinal slots. A more serious disadvantage is that since the fingers swing by flexing action, they must be relatively thin for the required flexibility and therefore are of limited tensile strength. In other devices of this type, independent fingers are employed but are not shaped and constructed for resistance to high magnitude forces.

The present invention meets this problem by employing relatively massive fingers which are aligned parallel with the axis of the cylinder and, therefore, are subject to mainly longitudinal tensile stress. Each of the individual fingers has an end enlargement at one end which functions as a bearing portion for pivotally anchoring the finger, and each of the fingers has a flange at its other end to serve as a latch element. Both the end enlargement and the end flange are stressed in shear when the fingers engage the piston, but both are of massive construction for high strength, and the shear forces are longitudinal forces lying close to the bodies of the fingers.

In the preferred practice of the invention, the circumferential set of latch fingers are of the shape of longitudinal sections severed from a cylindrical configuration by longitudinal radial saw cuts, the cylindrical configuration having a generally ring-shaped enlargement at one end and a flange at the other end. The sections of the ring-shaped enlargement constitute bearing portions of the individual fingers, and sections of the end flange constitute latching elements on the ends of the individual fingers. Spacer members of substantially the same cross section as the end enlargements may abut the bearing portions of the fingers and space the fingers apart.

The invention is further directed to the problem of biasing the fingers. As will be explained, in some practices of the invention, the fingers are biased by means exerting pressure against the heels or bearing ends of the fingers. In one example, spring means exerts the required end pressure, and in another example the fluid that actuates the piston is employed to exert the required end pressure. In another practice of the invention, the fingers are biased outward by a multiple-turn coil spring with the circumferential set of fingers embracing the coil spring.

One practice of the invention is further characterized by the provision of means to detect and indicate when the piston is at a limit position. As will be explained, a feature of the invention is the concept of employing a reciprocating locking sleeve for this purpose.

The features and advantages of the invention may be understood by reference to the following detailed description and the accompanying drawings.

In the drawings, which are to be regarded as merely illutsrative:

FIG. 1 is a longitudinal sectional view of one embodiment of the invention;

FIG. 2 is a perspective diagrammatic view showing how the circumferential set of latching fingers correspond to longitudinal segments of a cylindrical configuration with spacers between the bearing portions of the successive latching fingers;

FIG. 3 is a perspective view of one of the latching fingers employed in the first embodiment of the invention;

FIGS. 4 and 5 are fragmentary plan views of a latching finger and an associated pressure-applying means showing how the pressure-applying means creates a moment for biasing the finger;

FIG. 6 is a sectional view illustrating a second embodiment of the invention;

FIG. 7 is a sectional view illustrating a third embodiment of the invention; and FIG. 8 is a perspective view of a latching finger employed in the third embodiment of the invention.

The first embodiment of the invention shown in FIG. 1 includes a cylinder 10 and a piston, generally designated 12, slidingly mounted in the cylinder, the piston being mounted on one end of a piston rod 14 for extending and retracting the piston rod in a well known manner. The piston 12 is an assembly comprising a piston body 15 with a radial web 16 and two bushings 18 and 20 on opposite sides of the web. This piston assembly is mounted on a reduced end portion 22 of the piston rod and is clamped against a circumferential shoulder 24 of the piston rod by a nut 25. For sealing purposes the piston is provided with an outer circumferential O-ring 26 and the reduced end portion of the piston rod has a circumferential groove 28 confining a second O-ring 30.

The bushing 18 in cooperation with the piston body 15 forms a first annular or ring-shaped cavity 32 for journaling the bearing portions 34 of a first set of latch fingers 35, which fingers are formed with latch elements or shoulders 36 on their outer ends. In like manner, the bushing 20 cooperates with the piston body 15 to form a second annular or ring-shaped cavity 38 to journal the bearing portions 34 of a second set of latch fingers 35a which are identical to the first set.

The shape of the latch fingers 35 and 35a may be understood by reference to FIG. 2 which shows in phantom a cylindrical member 40 with a ring-shaped enlargement 42 at one end and a radial flange 44 at the other end, the ring-shaped enlargement extending radially inwardly of the cylindrical body and the radial flange 44 extending radially outward. The latch fingers 35 are in effect longitudinal sections of the cylindrical body 40 produced by sawing the cylindrical body longitudinally to produce the individual latch members with the latch members separated by longitudinal kerfs or saw cuts 45. Thus the sections of the ring-shaped enlargement 42 are the bearing portions 34 of the latch fingers and the sections of the radial flange 44 are the latch elements 36 of the latch fingers. The successive latch fingers 35 of the circumferential set are spaced apart by spacer members 46 which are of the shape of sections of the ring-shaped enlargements 42 and which in practice may be simple disks sliced from a round rod.

As shown in FIG. 1, the two sets of latch fingers 35 and 35a extend through annular openings 48 of the two annular or ring-shaped cavities 32 and 38.

The latch fingers 35 cooperate with a fixed latch ring 50 and a reciprocative locking sleeve 52. In like manner, the latch fingers 35a cooperate with a fixed latch ring 54 at the other end of the cylinder and a second reciprocative locking sleeve 55. The latch ring 50 is anchored between one end of the cylinder 10 and an adjoining cylinder head 56, and in like manner the second locking sleeve 55 is clamped between the other end of the cylinder and a second cylinder head 58. As shown in FIG. 1, the cylinder head 56 is mounted on the cylinder 10 by screw threads, and the second cylinder head 58 is anchored by a nut 60 that has a radially inward flange 62 in engagement with an outer circumferential rib 64 of the cylinder.

The locking sleeve 52 is provided with outer and inner O-rings 65 and is urged from a release position to a locking position by a suitable coil spring 66. The second locking sleeve 55 has an outer O-ring 68 and is urged towards its locking position by an associated coil spring 69. At its locking position, locking sleeve 52 has a cylindrical locking flange 70 which engages the outer ends of the associated latch fingers 35 to hold the latch fingers against the corresponding latch ring 50, as may be seen in FIG. 1, where the locking sleeve 52 locks the latch fingers 35 in engagement with the latch ring 50. In like manner, the second locking sleeve 55 has a circumferential shoulder 71 at its leading end to releasably hold the latch fingers 35a in engagement with the latch ring 54. Each of the two locking rings 52 and 55 is retractable by fluid pressure, and for this purpose each of the two cylinder heads is suitably vented. Thus, the cylinder head 56 has a vent bore 72, and a bore 73 in the cylinder head 58 is a vent in one of its functions. The locking cylinder 52 is retracted by fluid pressure admitted into the cylinder 10 on the corresponding side of the piston 12 by a corresponding port 74 at the corresponding end of the cylinder. In like manner, the second locking sleeve 55 is retracted by fluid pressure admitted through a second port 75 at the other end of the cylinder.

The locking sleeve 55 is provided with a stem 82 to permit the locking sleeve to be manually retracted in opposition to the pressure of the spring. The stem 82 extends through the previously mentioned vent bore 73 and into an external slot 85 of the cylinder head 58. The portion of the stem 82 that lies in the slot 85 is formed with a diametrical slot 86 for operation by a manual lever 88. The lever 88 is fulcrumed on a cross pin 90 in the cylinder head slot 85, and one arm 92 of the lever extends into the diametrical slot 86 of the stem 82. It is apparent that the lever 88 may be manually operated to cause retraction of the locking sleeve 55 when the fluid pressure in the cylinder 10 is too low to overcome the spring.

It is essential that the two sets of latch fingers 35 and 35a be suitably biased radially outward for engagement with the two latch rings 50 and 54 respectively. In this first embodiment of the invention, means is provided to exert biasing pressure against the bearing portions 34 of the two sets of fingers. For this purpose, a washer 94 is mounted in each of the two cavities 32 and 38 contiguous to the bearing portions 34 of the two sets of latch fingers. The two washers 94 are subjected to pressure selectively by a plurality of small auxiliary pistons 96 that are mounted in corresponding longitudinal bores 98 in the web 16 of the piston body 15. Each of the auxiliary pistons 96 is provided with an O-ring 100 to make the piston responsive to fluid pressure differentials across the length of the longitudinal bores. When fluid pressure is applied to one side or the other of the piston 12, the fluid pressure acts on the corresponding ends of the auxiliary pistons 96 to urge the auxiliary pistons against the corresponding washer 94, thereby to exert pressure against the bearing portions 34 of the corresponding set of latch fingers.

The manner in which the latch fingers 35 and 35a are biased by the pressure of the two washers 94 may be understood by referring to FIGS. 4 and 5 which show one of the latch fingers 35a in abutment with the corresponding washer 94. When the latch finger 35a is perpendicular to the face of the washer 94 and parallel with the axis of the cylinder 10, as shown in FIG. 4, the full width of the bearing portion 34 of the latch finger abuts the surface of the washer 94. On the other hand, if the latch finger 35a is forcibly swung radially inward from its normal longitudinal alignment, the two opposite ends 34a and 34b of the bearing portion 34 of the latch finger rock backward against the washer 94 in opposition to the pressure applied to the washer. The reason that the two ends of the bearing portion 34 rock backward against the washer 94 may be understood when it is considered that the bearing portion 34 is arcuate across its width and is rocked out of parallel relationship with the washer.

Associated with the locking cylinder 52 is an indicator switch 102 having an operating plunger 104 that senses the position of the locking cylinder. For this purpose, the locking cylinder 52 has an outer circumferential groove 105 into which the operating plunger or feeler 104 extends when the locking sleeve is at its advanced or locking position shown in FIG. 1.

Associated with the second locking sleeve 55 is a second indicator switch 106 having an operating plunger or feeler 108 which responds to an outer circumferential groove 110 of the locking sleeve. Preferably, two indicator lamps (not shown) controlled by the switches 102 and 106 respectively are energized when the locking sleeves are at their advanced positions locking the piston 12. Thus, the switch 102 is closed in FIG. 1 to indicate that the piston 12 is at the corresponding end of the hydraulic cylinder 10 and locked.

*Operation*

The manner in which the device functions for its purpose may be understood from the foregoing description.

In FIG. 1, the piston 12 is at its left limit position, and accordingly the indicator switch 102 is closed as heretofore explained. The latch fingers 35 are in engagement with the latch ring 50 and are locked in their positions of engagement by the locking sleeve 52, the cylindrical locking flange 70 of the locking ring engaging the ends of the locking fingers to hold them in their outward positions in a positive manner. Since the piston 12 is mechanically secured at its left limit position in this manner, the fluid in the cylinder 10 on the right side of the piston need not be under pressure. If the fluid in the cylinder is under pressure, however, the pressure of the fluid causes the auxiliary pistons 96 to exert presusre against the left washer 94 and thereby exert biasing pressure against the latch fingers 35, even though such biasing pressure is not necessary at this time.

At the other end of the cylinder, the second locking sleeve 55 is held at its position of maximum extension by the corresponding coil spring 69, a radial flange 112 of the locking sleeve abutting the latch ring 54. The right hand indicator switch 106 is open, since its plunger or feeler 108 is not in register with the circumferential groove 110 of the locking sleeve.

If the pressure is released in the cylinder on the right hand side of the piston 12 and fluid under pressure is admitted through the left port 74 to apply fluid pressure to the left side of the piston, the fluid pressure acting on the leading end of the locking sleeve 52 causes the locking sleeve to retract in opposition to the force of the spring 68, thereby causing the locking sleeve to release the latch fingers 35. At the same time, the fluid pressure acts on the left side of the piston to initiate rightward shift of the piston away from its left limit position. The pull on the latch fingers 35 by the piston causes the latch fingers to be cammed radially inward by the latch ring 50 to release the piston for its rightward movement. At the same time, the fluid pressure on the left side of the piston 12 is communicated to the auxiliary pistons 96 to cause the auxiliary pistons to shift rightward against the rightward washer 94 and thus bias the latch fingers 35a towards their latching positions.

As the piston 12 approaches the right hand latch ring 54, the latch fingers encounter the locking sleeve 55 and retract the locking sleeve against the opposition of the corresponding coil spring 69. At the same time, the latch fingers 35a are cammed radially inward by the latch ring 54 until they pass the latch ring, whereupon the biasing force exerted by the auxiliary pistons 96 causes the latch rings to swing radially outward to positions of effective engagement with the latch ring. As soon as the latch fingers 35a engage the latch ring 54, the locking sleeve 55 advances slightly under the force of the spring 69, the annular latching shoulder of the locking sleeve engaging the ends of the latch fingers to hold the latch fingers in their latching positions in a positive manner.

The left indicator switch 102 opens when the fluid pressure on the left side of the piston 12 causes the locking sleeve 52 to retract from the position shown in FIG. 1, thereby moving the groove 105 of the locking sleeve out of register with the plunger or feeler 108 of the indicator switch. In the event that the pressure on the left side of the piston is reduced while the piston is away from its left limit position, the spring 68 causes the locking sleeve 52 to shift rightward to a limit position at which a radial flange 114 of the locking sleeve abuts the latch ring 50. At this advanced position of the locking sleeve, the groove 105 is out of register with the operating plunger or feeler 108 of the switch 102 to cause the switch 102 to be open.

Before the rightwardly moving piston reaches the right locking sleeve 55, the locking sleeve is in the position shown in FIG. 1, and the indicator switch 106 is open. As soon as the locking sleeve is retracted by the piston 12 as the piston reaches its right limit position, the circumferential groove 110 of the locking sleeve registers with the plunger or feeler 108 of the switch 106 to cause the switch to close and thereby indicate that the piston is at its right limit position.

*The second embodiment of the invention shown in FIG. 6*

FIG. 6 illustrating a second embodiment of the invention is largely similar to FIG. 1, as indicated by the use of corresponding numerals to indicate corresponding parts. The essential difference is that in FIG. 6 the latch fingers are biased by spring pressure, whereas in the previously described FIG. 1 the latch fingers are biased by fluid pressure.

In FIG. 6 the piston 12a has a piston body 15a with a radial web 16a. The piston assembly provides a cavity 120 to journal the latch fingers 35 and provides a second cavity 122 to journal the latch fingers 35a. Associated with each of the two sets of latch fingers is a previously described washer 94, and each washer is subjected to continuous pressure by a pair of Belleville washers 124 which are positioned back to back under axial compression in the manner shown. Except for the manner in which the latch fingers 35 and 35a are biased by the Belleville washers 124, the second embodiment of the invention functions in the same manner as the first described embodiment.

*The third embodiment of the invention shown in FIG. 7*

FIG. 7, illustrating the third embodiment of the invention, shows a piston 12b which includes a piston body 15b having a radial web 16b, the piston body being provided with an outer circumferential O-ring 125 and an inner circumferential O-ring 126. The radial web 16b is backed against a circumferential shoulder 128 of a piston rod 14b and is clamped against the shoulder by a nut 130. The nut 130 is of tapered configuration as shown, and the piston rod 14b has a flared portion 132 adjacent the circumferential shoulder 128, which flared portion is of the same taper as the nut 130. The flared portion 132 of the piston rod cooperates with the piston body 15b to form an annular cavity 134 for journaling a first set of latch fingers 135, and the tapered nut 130 cooperates with the piston body to form a second annular cavity 136 to journal a second similar set of latch fingers 135a.

The latch fingers 135 are, in general, similar to the previously described latch fingers 35 but differ in that the bearing portions 138 of the latch fingers protrude radially outwardly instead of radially inwardly. Thus, the bearing portions 138 as well as the latch elements 140 of the latch fingers are on the outer sides of the latch fingers.

The annular cavities 134 and 136 are of generally ring-shaped configuration, as heretofore described; but since the bearing portions 138 are on the outer sides of the latch fingers, the bearing portions must be cut away or relieved to give the latch fingers the required freedom for pivotal movement in the cavities. FIG. 8 shows how each of the bearing portions 138 is cut away or relieved to form four faces 142.

In this third embodiment of the invention, each of the two sets of latch fingers 135 and 135a is biased radially outward by a multiple turn coil spring 144. Preferably, each of the latch fingers is formed with a groove 145 on its inner side, as best shown in FIG. 8, for the purpose of engaging the corresponding coil spring 144. The two sets of latch fingers embrace the two coil springs 144, as shown, with sufficient snugness to cause the coil springs to bias the fingers towards their latching positions. An important feature of this construction is the reliability of the two coil springs 144 for their biasing action. If one of the coil springs 144 is broken, the coil spring will still serve as a biasing means as long as a full turn or nearly a full turn of the coil spring is intact.

It is apparent that in all three embodiments of the invention the latch fingers are of exceptionally rugged construction of and capable of withstanding exceedingly high forces both in tension along the length of each latch finger and in shear at each of the two ends of the latch finger.

Our description in specific detail of the selected embodiments of the invention will suggest various changes, substitutions, and other departures from our disclosure within the spirit and scope of the appended claims.

We claim:

1. In a fluid-pressure actuator having a cylinder member and a piston member reciprocable axially therein, means for locking the piston at a limit position in said cylinder comprising:

a circumferential set of discrete latch fingers of curved transverse cross-section of the shape of longitudinal sections severed from a cylindrical configuration by longitudinal radial saw cuts, said cylindrical configuration having a concentric, generally ring-shaped enlargement at one end and a flange at the other end, the sections of the enlargement constituting bearing portions of the individual fingers and the sections of the flange constituting latch elements of the individual fingers;

means fixed relative to one of said cylinder member and piston member and forming a circumferentially continuous generally ring-shaped cavity confining and journaling said bearing portions of the fingers for swinging movement of the fingers;

latch means fixed relative to the other of said cylinder member and piston member to engage said latch elements to releasably anchor the piston member at a limit position relative to the cylinder member, said fingers being biased towards their latching positions; and locking means to engage said fingers to positively lock the fingers at their latched positions, said locking means being releasable in response to fluid pressure on the side of the piston in the direction to retract the piston from the limit position.

2. A combination as set forth in claim 1 which includes discrete spacer members interposed between the bearing portions of the successive fingers of the circumferential set of fingers, in the ring-shaped cavity, said spacer member being of the thickness of the saw cuts.

3. A combination as set forth in claim 1 in which said bearing portions of the latch fingers protrude radially outward of the axis of the circumferential set.

4. A combination as set forth in claim 1 in which said bearing portions of the fingers protrude radially inwardly towards the axis of the circumferential set; and
in which said bearing portions of the fingers are relieved to permit the bearing portions to rotate in said cavity as required for the latching operation.

5. In a fluid-pressure actuator having a cylinder member and a piston member reciprocable axially therein, means for locking the piston at a limit position in said cylinder comprising:
a circumferential set of discrete latch fingers of curved transverse cross-section of the shape of longitudinal sections severed from a cylindrical configuration by longitudinal radial saw cuts, said cylindrical configuration having a concentric, generally ring-shaped enlargement at one end and a flange at the other end, the sections of the enlargement constituting bearing portions of the individual fingers and the sections of the flange constituting latch elements of the individual fingers;
means fixed relative to one of said cylinder member and piston member and forming a generally ring-shaped cavity confining and journaling said bearing portions of the fingers for swinging movement of the fingers, said cavity having an annular concentric opening through which the latch fingers extend;
latch means fixed relative to the other of said cylinder member and piston member to engage said latch elements to releasably anchor the piston member at a limit position relative to the cylinder member;
means to exert longitudinal pressure against the bearing ends of the latch fingers to bias the fingers towards their latching positions; and
locking means movable to a locking position to engage said fingers to positively lock the fingers at their latched positions, said locking means being releasable in response to fluid pressure on the side of the piston in the direction to retract the piston from the limit position.

6. A combination as set forth in claim 5 in which said pressure-exerting means is Belleville spring means.

7. A combination as set forth in claim 5 in which said pressure-exerting means is fluid-pressure means responsive to the fluid pressure that drives the piston to the limit position.

8. A combination as set forth in claim 7 which includes spring means biasing said locking means towards its locking position.

9. In a fluid-pressure actuator having a cylinder member and a piston member reciprocable axially therein, means for locking the piston at a limit position in said cylinder comprising:
a circumferential set of discrete latch fingers of curved transverse cross-section of the shape of longitudinal sections severed from a cylindrical configuration by longitudinal radial saw cuts, said cylindrical configuration having a concentric, generally ring-shaped enlargement at one end and a radial flange at the other end, the sections of the enlargement constituting bearing portions of the individual fingers and the sections of the flange constituting latch elements of the individual fingers;
means fixed relative to one of said cylinder member and piston member and forming a generally ring-shaped cavity confining and journaling said bearing portions of the fingers for swinging movement of the fingers;
latch means fixed relative to the other of said cylinder member and piston member to engage said latch elements to releasably anchor the piston member at a limit position relative to the cylinder member;
a multiple-turn spring concentric with said set of latch fingers and yieldingly embraced by the fingers to bias the fingers towards their latching positions; and
locking means to engage said fingers to positively lock the fingers at their latched positions, said locking means being releasable in response to fluid pressure on the side of the piston in the direction to retract the piston from the limit position.

10. In a fluid pressure actuator having a cylinder member and a piston member reciprocable axially therein, means for locking the piston at a limit position in said cylinder comprising:
a circumferential set of latch fingers pivotally mounted on one of said cylinder member and piston member;
latch means fixedly mounted on the other of said cylinder member and piston member for engagement by said latch fingers to releasably anchor the piston member at a limit position; and
a multiple-turn spring concentric with said latch fingers and yieldingly embraced by the fingers to bias the fingers radially outward towards their positions of engagement with said latch means.

11. In a fluid-pressure actuator having a cylinder member and a piston member reciprocable axially therein, means for locking the piston at a limit position in said cylinder comprising:
two annular latch means fixedly mounted at the opposite ends respectively of said cylinder;
two circumferential sets of latch fingers pivotally mounted respectively on the opposite ends of said piston member to engage said two fixed latch means respectively to anchor the piston member at the two ends of the cylinder member selectively; and
fluid-pressure-responsive means mounted on said piston member to bias said sets of latch fingers towards their latching positions in response to the fluid pressure against the piston member.

12. A combination as set forth in claim 11 in which said fluid-pressure-responsive means includes auxiliary piston means slidably mounted in said piston member for response to the pressure differential across the piston member.

13. A combination as set forth in claim 1 in which the latch fingers are biased radially outward by annular spring means that is in contact with the inner circumference of the circumferential set of latch fingers and tends to expand the circumferential set.

14. A combination as set forth in claim 13 in which the circumferential set of latch fingers is formed with an inner circumferential groove to seat the annular spring means.

15. A combination as set forth in claim 9 in which said bearing portions of the latch fingers are relieved to permit the bearing portions to rotate in the ring-shaped cavity as required for the latching operation.

References Cited by the Examiner
UNITED STATES PATENTS

| | | | |
|---|---|---|---|
| 2,295,961 | 9/42 | Meyer | 92—5 |
| 2,434,828 | 1/48 | Ashton et al. | 92—21 |
| 2,568,561 | 9/51 | Perdue et al. | 92—5 |
| 2,771,060 | 11/56 | Allbright | 92—24 |
| 2,813,518 | 11/57 | Driskel et al. | 92—21 |
| 3,003,471 | 10/61 | Bodem et al. | 92—24 |

RICHARD B. WILKINSON, *Primary Examiner.*
FRED E. ENGELTHALER, *Examiner.*